United States Patent

[11] 3,616,913

| [72] | Inventor | James Sims Reid |
| | | Hudson, Ohio |
| [21] | Appl. No. | 47,020 |
| [22] | Filed | June 17, 1970 |
| [45] | Patented | Nov. 2, 1971 |
| [73] | Assignee | The Standard Products Company |
| | | Cleveland, Ohio |
| | | Continuation-in-part of application Ser. No. 781,141, Dec. 4, 1968. |

[54] APPARATUS AND METHOD FOR WASTE DISPOSAL
7 Claims, 7 Drawing Figs.

[52] U.S. Cl. .................................................. 210/104,
210/110, 210/149, 210/152, 210/181
[51] Int. Cl. .................................................. B01d 21/24
[50] Field of Search .................................... 210/104,
71, 152, 109, 110, 149, 181; 4/8, 131; 110/9

[56] References Cited
UNITED STATES PATENTS

| 3,139,626 | 7/1964 | Blankensaid | 4/131 |
| 3,342,337 | 9/1967 | Reid | 210/152 |
| 3,357,381 | 12/1967 | Stevens | 110/9 |
| 3,509,999 | 5/1970 | Reid et al | 210/152 X |

Primary Examiner—John Adee
Attorney—Meyer, Tilberry and Body

ABSTRACT: An improved waste disposal apparatus and method in which a boiler unit is positioned between the block of an engine and the exhaust manifold, with passages in the boiler unit through which the hot gases pass, thereby heating and vaporizing liquid waste material in the boiler. Air is supplied to the boiler to provide excess free oxygen for burning and consuming organic solids. The air also sweeps the boiler free of ash.

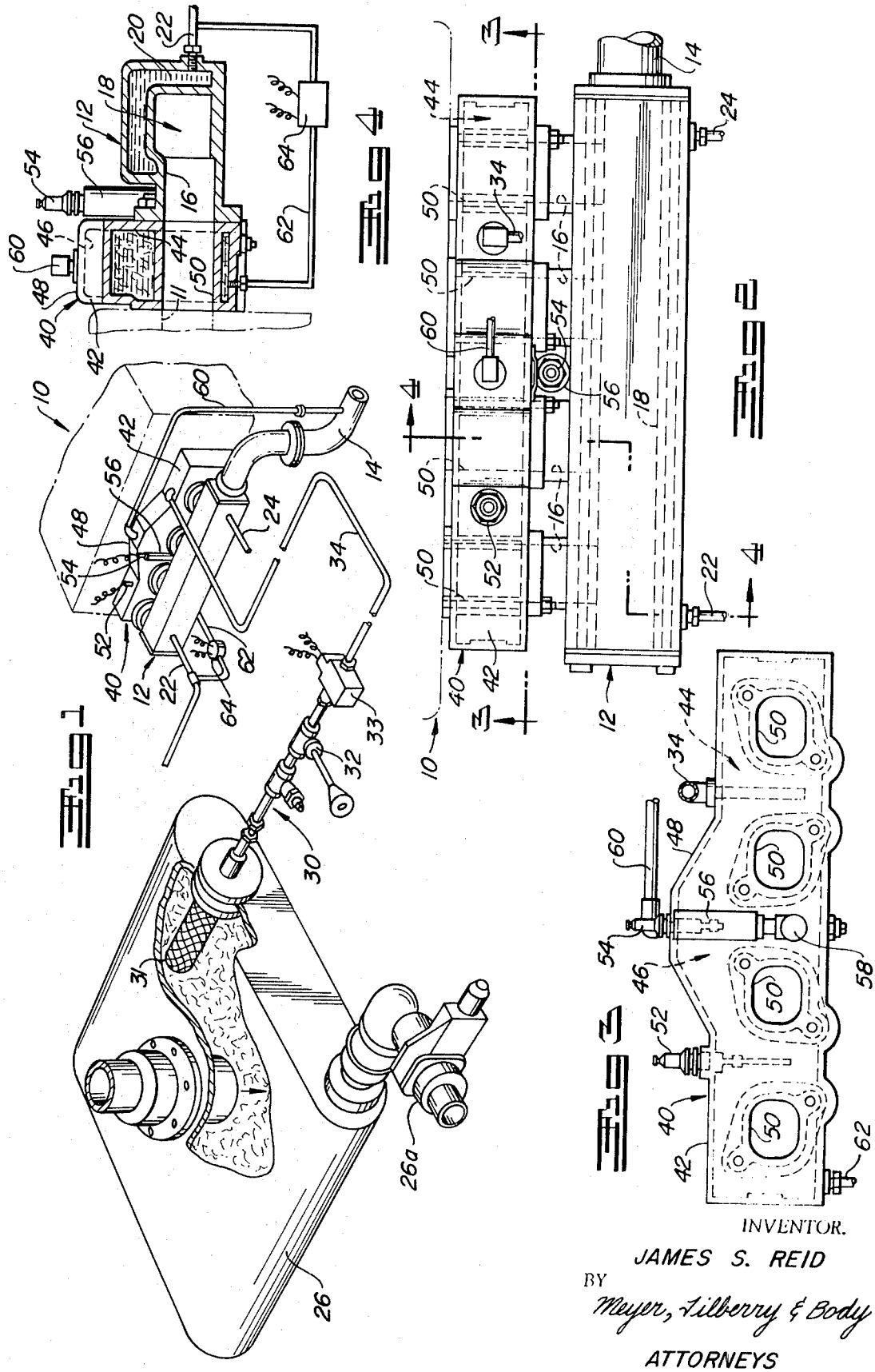

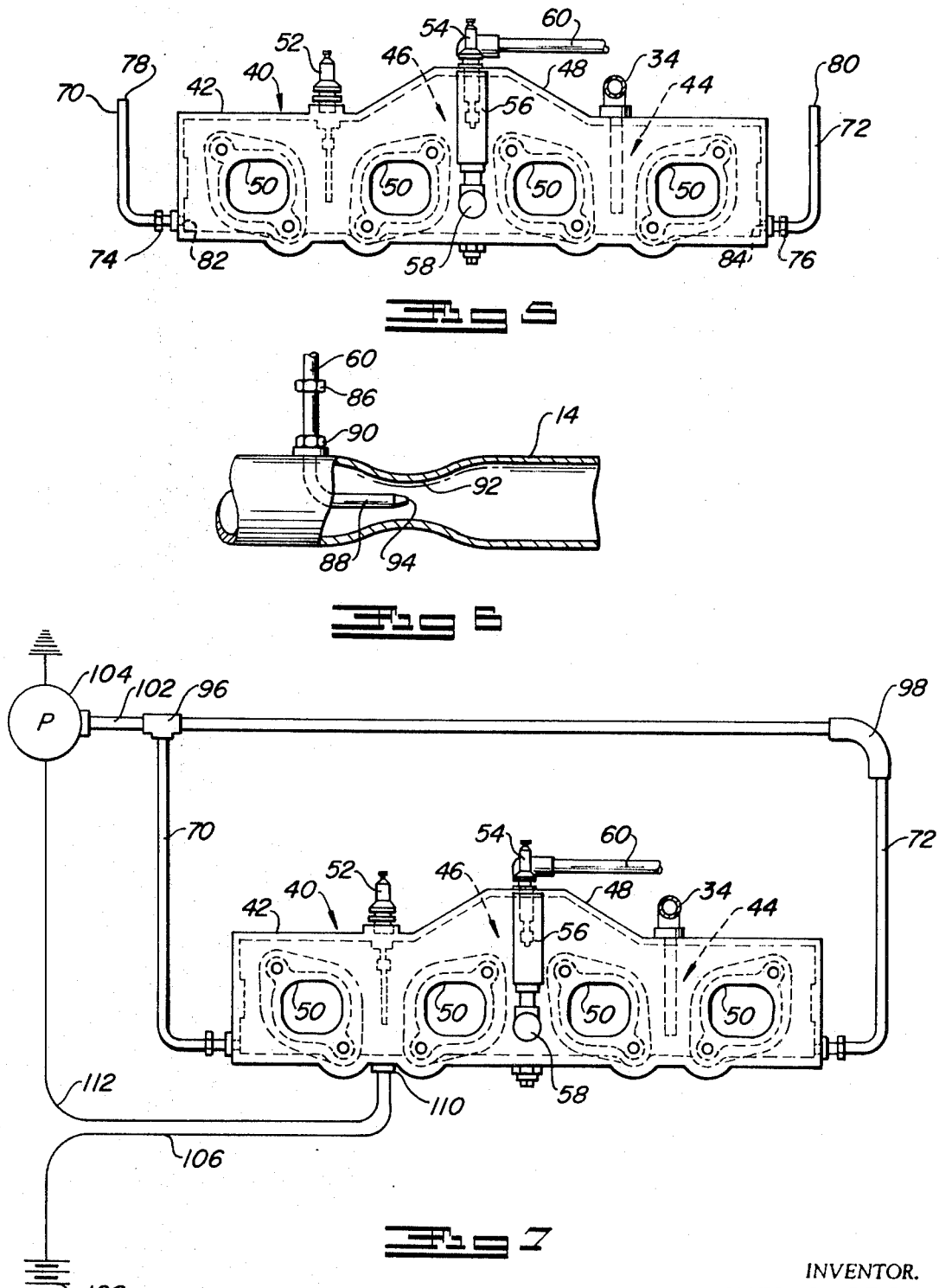

APPARATUS AND METHOD FOR WASTE DISPOSAL

This application is a continuation-in-part of U.S. Pat. application Ser. No. 781,141 filed Dec. 4, 1968.

This invention relates generally to improvements in waste disposal systems and, more particularly, to a system specially designed for the disposal of human waste as well as other like disposable waste products.

Although not limited thereto, the waste disposal system of this invention has particular utility in connection with marine engines of the type used in marine craft. The system may also be employed to advantage in other types of vehicular units such as buses, trucks, housetrailers, mobile homes and various other classes of vehicles utilized for human transportation. In addition, the waste disposal system of this invention may find utility in domestic housing installations or the like where a conventional sewage system such as those presently in use in most large municipalities is not available.

There is disclosed in my prior U.S. Pat. No. 3,342,377 an improved waste disposal system which is particularly applicable for use with land-type vehicles. The system which is the subject of that prior patent overcomes many of the shortcomings in the prior art, in that it is operable over extended periods of time without any evidence of accumulation of waste materials which would limit the period of use of the vehicle with which it is associated. Moreover, the waste disposal system disclosed in that patent is completely self-contained so that its operation prevents contaminants from being discharged into the atmosphere and also provides for the disposal of human waste products and/or the like, while the vehicle is in transit.

Although the system disclosed in the aforesaid patent operates entirely satisfactorily when utilized on land-type vehicles, such a unit is not adapted for use with waterborne craft such as powerboats. There are several reasons for this, foremost of which is the space limitation imposed on the marine craft and engines associated therewith. Also, the system of my prior patent contemplated that the vehicle would be operated for extended periods of time, thereby permitting the disposal of the collected waste material while the vehicle was in operation. However, marine craft, such as a pleasure boat, normally are operated only intermittently for relatively short periods of time although the boat may be occupied for hours at a time. Accordingly, it is desirable to employ a waste disposal system which can dispose of substantial quantities of waste materials in a relatively short period.

It has been found that extensive use of the prior system also resulted in formation of a caked deposit of organic solids in the boiler. This caked deposit insulates portions of the boiler against optimum heat transfer and greatly reduces the efficiency of the unit. In addition, flow of liquid waste to a hot and dry boiler having a caked deposit often causes the deposit to break up into large chunks. These chunks may block the boiler outlet. It is desirable to eliminate this caked deposit of organic material from the boiler.

The present invention contemplates a new and improved waste disposal system which eliminates the aforementioned drawbacks, and provides a system which is readily adapted for use with the existing types of marine engines as well as other types of engines and which is compact in construction but which is efficient in operation.

In accordance with the principles of this invention, there is provided an improved waste disposal system for use with a power source such as an engine which generates waste heated gases and which has an exhaust system including an exhaust manifold and exhaust pipe for disposing of the heated gases. The system contemplates a boiler unit which is positioned between the engine block and the exhaust manifold with the boiler including a chamber in which liquified waste materials may be introduced. Passages in the boiler provide a means by which the heated waste gases of the engine are passed from the engine to the exhaust manifold with the heated gases vaporizing, and thereby purifying, the liquid waste materials in the boiler.

In accordance with another aspect of the invention, inlet means is provided in the boiler for admitting ambient air thereto. Such air provides excess free oxygen within the boiler so that organic solids will be burned and consumed to prevent buildup of a caked deposit. The air also flows through the boiler to provide a cooling effect in the absence of liquid, and to sweep ash from the boiler.

A more specific aspect of the improved system is the use of the boiler unit as an integral part of the exhaust system of the engine thereby to minimize the space required for the waste disposal system and to maximize the efficiency of the disposal system.

Another specific aspect of the system is the use of the liquid waste material as a cooling medium for the boiler in the exhaust system with alternate means provided for cooling the boiler when liquid waste is not being vaporized in the boiler.

It is one of the primary objects of this invention to provide an improved waste disposal system which is applicable for use with marine-type vehicles or other vehicles in which limited space is available to accommodate such a system.

A further object of the invention is to provide an improved waste disposal system which utilizes the waste heated gases of the engine before the gases have been discharged into the exhaust manifold and, hence, are at a maximum heated condition.

Still another object of the invention is to provide a compact boiler unit for use in a waste disposal system, which unit when installed becomes an integral part of the exhaust system of the engine with the liquid waste material serving as a cooling medium for the boiler.

It is an additional object of the invention to prevent buildup of a caked deposit of organic solids in a waste disposal system of the type described.

It is another object of the present invention to supply ambient air to a waste disposal system of the type described in order to provide excess free oxygen for burning organic material.

It is also an object of the invention to supply air to a waste disposal system of the type described for cooling the system and sweeping ash therefrom.

Other objects and features of the invention will become more apparent upon a complete reading of the following description which, together with the attached drawings, describes but one preferred embodiment of the invention.

Referring now to the drawings wherein like reference numerals indicate like parts in the various views:

FIG. 1 is a schematic perspective view of the improved waste disposal system installed on an engine.

FIG. 2 is a top plan view illustrating the relationship between the boiler unit of the improved waste disposal system and the exhaust manifold.

FIG. 3 is a sectional view taken along lines 3—3 of FIG. 2.

FIG. 4 is a sectional view taken along line 4—4 of FIG. 2.

FIG. 5 is the same view as FIG. 3 and further including air supplying conduits connected with the waste disposal system.

FIG. 6 is a side elevational view of an exhaust conduit and connection with the outlet from the boiler of FIG. 5.

FIG. 7 is the same view as FIG. 5 and further including an air pump and control connected with the waste disposal system.

Referring now to FIG. 1, the waste disposal system of the present invention is illustrated as adapted for use with a source of power such as an internal combustion engine schematically illustrated at 10. The engine 10 may be of any conventional construction and may be a marine engine or other type of engine suitable for powering a vehicle. Typically, a marine engine includes an exhaust manifold 12 which is normally secured directly to the block of the engine and to which one end of an exhaust pipe 14 is connected. As is conventional, the exhaust manifold 12 includes a plurality of exhaust ports 16 formed in one wall of the manifold with the ports being in communication with the exhaust ports 11 in the block leading from the cylinder chambers. The products of combustion in the engine are discharged into the exhaust manifold chamber 18 and then through the exhaust pipe 14 to the atmosphere. A cooling jacket 20 normally surrounds at least a portion of the manifold chamber 18 and cooling water is circulated through the jacket 20 by an inlet tube 22 and an outlet tube 24.

It will be appreciated that in engines such as a V-8 engine in which there are two banks of cylinders, two exhaust manifolds will be provided with one manifold on either side of the engine block.

As stated, the hot exhaust gases which normally emerge from the engine 10 pass through the exhaust ports 16 into the manifold chamber 18 and then to the exhaust pipe 14 where re the gases are discharged. These exhaust gases are normally at very high temperatures as they emerge from the engine 10 and it is these gases which this invention utilizes as the means to vaporize the liquid waste material present in the waste disposal system described hereinafter.

The waste disposal system includes a conventional source of waste products such as a water closet, sink or shower, all of which are a source of waste products which must be disposed of in a sanitary fashion. Typically the disposal of such waste products has been accomplished through the use of a septic tank 26 which is conveniently located, in the case of a vehicle, in a place readily available for cleaning, maintenance and the like. A drain 26a may be provided on the waste tank, preferably adjacent to the bottom thereof, to facilitate cleaning of the tank.

The tank 26 is connected to the source of waste products and is constructed to function as a conventional septic tank whereby, in a manner well-known, solid materials are digestively attacked by anaerobic organisms and are thereby turned with the fluid into a partially purified solution. Obviously, various constructions of tanks may be employed without departing from the principals of this invention.

An outlet conduit assembly, indicated generally by the reference numeral 30, is connected at one end to the waste tank 26 and includes a suitable filter 31 which is located inside the tank. The filter 31 defines a liquid level wherein a substantially complete anaerobic process may be performed on the solid waste materials and also functions to prevent the escape of any solids from the tank 26. The outlet conduit assembly may also include a suitable shut-off valve 32 and an in-line liquid metering pump 33 of suitable construction.

Connected to the discharge port of the pump 33 is a line 34 which connects the pump with a boiler unit, indicated generally by the reference numeral 40. The boiler unit comprises a housing 42 which may be of any suitable material such as cast aluminum. The housing 42 may be made-up of either as a single integral unit or may be comprised of a plurality of sectional units which, when assembled form a complete unit. The housing 42 includes a fluid chamber 44 in the interior thereof and a steam chamber 46 which is defined by a raised portion 48 of the housing 42. The housing 42 further includes a plurality of passages 50 which extend transversely through the housing. The passages 50 are equal in number and size to the exhaust ports of the engine with which the boiler unit is to be employed. Thus, if the unit is to be used with a V-8 engine, a pair of boiler units 40 will be used with each unit including four passages 50 which are adapted to cooperate with the exhaust ports associated with each bank of cylinders.

The boiler unit 40 includes a pair of liquid level sensing electrodes or probes 52, 54. The probe 52 extends into the liquid chamber 44 to a depth adjacent the bottom of the passages 50. The probe 54 is disposed in a probe housing 56 which is interconnected by a conduit 58 with the liquid chamber in the housing 42. The inner end of the probe 54 is positioned at approximately the level of the juncture between the liquid chamber 44 and the steam chamber 46. Both of these probes are interconnected by appropriate electrical leads to the pump 33. Both probes are of the type commercially available from companies such as B. W. Controller Corporation, Birmingham, Michigan.

An outlet conduit 60 is in communication at one end with the steam chamber 46 and at the other end with the exhaust pipe 14.

The fluid chamber 44 in the boiler 40 is also connected by line 62 with the inlet line 22 leading into the water jacket 20. A control valve 64 is located in the line 62 whereby the liquid chamber 44 may be selectively placed in communication with the line 22 for a purpose hereinafter described.

The boiler unit 40 is employed by assembling it between the exhaust manifold 12 and the block of the engine 10. This is illustrated in FIG. 4 wherein the boiler is secured to the block of the engine where the exhaust manifold is normally located with the exhaust manifold 12 being connected to the boiler instead of directly to the block. As is apparent from FIG. 4, the passages 50 in the boiler 40 are aligned with the exhaust ports 11 in the block and with the exhaust ports 16 leading into the exhaust chamber 18 in the manifold 12. In this manner, the hot exhaust gases passing from the engine cylinders are discharged directly into the passages 50 in the boiler 40 and subsequently into the exhaust manifold where they are discharged to the exhaust pipe.

The above-described waste disposal system operates in the following manner. The waste material is deposited in the waste tank 26 where it is converted into a partially purified solution. When the level of liquid waste in the tank has risen to the level of the filter 31 and it is desired to dispose of this liquid material, the fluid is pumped by the pump 33 through the line 34 to the boiler unit 40 where it is deposited in the fluid chamber 44. The operation of the pump 33 is controlled by the probes 52, 54. Thus, the pump 33 will be actuated when the level of the liquid in the fluid chamber 44 is below the end of the probe 52 and operation of the pump 33 will be discontinued when the level of liquid in the fluid chamber 44 reaches the end of probe 54. In this manner, flooding of the boiler unit 44 is prevented.

With the engine 10 running, the hot exhaust gases are discharged directly into the passages 50. Because of the elevated temperatures of these exhaust gases, the boiler unit and the liquid disposed therein is raised to a temperature where the liquid commences to vaporize, with the vapors collecting in the steam chamber 46. As the liquid is vaporized, the liquid level in the fluid chamber 44 decreases until it reaches a level where the probe 52 again actuates the pump 33 and the liquid level is brought back up to the level governed by the probe 54. Meanwhile, the vapors collecting in the steam chamber 46 pass out of the boiler unit 40 through the discharge line 60 and are then discharged into the exhaust pipe 14 where it is mixed with the exhaust gases and discharged into the atmosphere. Some of the vapors in the tube 60 may become cooled and revert partially or substantially to a liquid form prior to being discharged into the exhaust pipe 14; however, since both the vapors and the condensed liquid in the tube 60 have been subjected to the elevated temperatures present in the steam chamber 46 they are in a purified condition so that the resultant gases or liquid discharged from the exhaust pipe do not create any health hazards.

It is apparent that the liquid waste material in the liquid chamber 44 acts as a coolant for the boiler unit 40 and prevents the unit from reaching excessive temperatures. However, in the event the level of the liquid in the tank 26 falls below the filter 31, it will be apparent that the pump 33 will be in effective to supply liquid to the boiler unit 40. In such circumstances, the boiler unit may tend to reach excessive temperatures once the liquid in the chamber 44 has been dissipated. To prevent this, the control valve 64 may then be actuated by appropriate means to place the cooling water inlet 22 in communication with the liquid chamber 44 and thereby supply a cooling liquid to the boiler unit 40. As will be readily understood, the fluid introduced in this manner will be dissipated through vaporization in the same manner as the liquid waste material. Once the liquid in tank 26 has reached a sufficiently high level, the control valve 64 will be operated to discontinue the flow of coolant from line 22 and the pump 33 will again supply liquid waste material to the boiler.

Several advantages of the boiler unit and the waste disposal system described hereinabove should be noted. The boiler unit provides a completely closed chamber into which the liquid waste products may be introduced and vaporized with no portion of the exhaust gases being mixed with the liquid waste material until after purification has been completed. In this manner, problems of corrosion are kept to a minimum. Moreover, because of the positioning of the boiler unit between the exhaust manifold and the block of the engine the boiler unit becomes, in effect, an integral part of the exhaust system and is subjected to very high temperatures which results in a highly effective conversion of the liquid waste material into a purified vaporized form. In addition, the compact construction of the boiler unit itself makes the system particularly well suited for applications in which only a limited space is available.

In accordance with another aspect of the invention, means is provided for feeding air to the vaporizing means defined by boiler unit 40. In accordance with one arrangement, as shown in FIG. 5, conduits 70 and 72 are connected to boiler unit 40 by suitable fittings 74 and 76. Conduits 70 and 72 have open inlet ends 78 and 80 which are open to atmosphere and positioned at least above chamber 44. Conduits 70 and 72 have outlets 82 and 84 opening into chamber 44. In this arrangement, conduit 62 of FIGS. 3 and 4 is eliminated so that cooling water is not supplied to chamber 44 of boiler unit 40 at any time. With the arrangement of FIG. 5, outlet conduit 60 from boiler unit 40 is connected by a suitable fitting 86 to a venturi nozzle 88 which in turn is connected to exhaust conduit 14 by a suitable fitting 90. As shown in FIG. 6, exhaust conduit 14 includes a smoothly curved reduced diameter internal portion 92 within which nozzle end 94 of venturi 88 is positioned. Operation of the embodiment of FIG. 5 to vaporize effluent from tank 26 is the same as that described with reference to FIGS. 1-4. However, once the level of liquid waste in chamber 44 falls below openings 82 and 84 to conduits 70 and 72, exhaust flowing through reduced diameter portion 92 of exhaust conduit 42 draws a vacuum through venturi 88 and line 60 so that air is drawn into chamber 44 through conduits 70 and 72. Such air sweeps through chamber 44 and is drawn through outlet conduit 60 to exhaust conduit 14. This flow of ambient air through conduit 70 and 72 into chamber 44 prevents the temperature of boiler unit 40 from becoming too high when there is no liquid waste in chamber 44. In addition, solid organic material which is deposited on the interior of boiler unit 40 upon complete vaporization of all of the liquid waste will be burned and consumed by the excess free oxygen provided through conduit 70 and 72. In previous arrangements, in which a closed boiler unit was used, solid organic material would not be completely burned and consumed because there was no oxygen present within the boiler unit. Solid organic material was simply dehydrated and formed a coating in the form of a caked deposit within the boiler unit. This caked deposit of dehydrated solid organic material formed a heat insulation which reduced the efficiency of the boiler unit and impaired heat transfer from the exhaust gases to liquid waste material within chamber 44. With the arrangement of FIG. 5, solid organic material remaining within chamber 44 is completely burned and consumed once all of the moisture is vaporized by the presence of excess free oxygen provided through conduit 70 and 72. Such solid organic material is completely burned to a fine ash which is then swept out of chamber 44 by air flowing through conduit 70 and 72 through chamber 44 and out outlet conduit 60 to exhaust conduit 14. It will be recognized that additional conduits such as 70 and 72 may be connected at other locations to boiler unit 40 so that the entire interior defined by chamber 44 is completely swept by a flow of air. Such air inlets may also be connected to the upper portion of boiler unit 40 or to steam chamber 46 if so desired. Connection of an air inlet to steam chamber 46 is often desirable so that the vapor drawn through outlet conduit 60 due to venturi action will also have air therein to provide excess free oxygen which will further breakdown odor producing compounds in the vapor while flowing through the hot gases in exhaust conduit 14.

In accordance with another arrangement, as shown in FIG. 7, air conduits 70 and 72 are connected by suitable fittings 96 and 98 with outlet conduit 102 of electrically driven air pump 104. The universal electric motor of air pump 104 is connected with the electrical system of the vehicle engine as schematically illustrated in FIG. 7. Electrical line 106 leads from battery 108 to thermocouple 110 attached to boiler unit 40. Electrical line 112 connects thermocouple 110 with the motor of air pump 104. With waste liquid in boiler unit 40, the temperature of boiler unit 40 will not rise substantially above 212° F. When no waste liquid is present in boiler unit 40, its temperature will rise and thermocouple 110 will close, at any desirable setting such as around 250° F., to start air motor 104 which then blows air through chamber 44 and out outlet pipe 60. With this arrangement, a venturi nozzle as described with reference to FIG. 6 is not necessary and outlet conduit 60 may simply be connected with exhaust conduit 14 or discharged to atmosphere. Air supplied to chamber 44 by pipe 104 will cool boiler unit 40 and also supply excess free oxygen so that solid organic material within boiler unit 40 will be burned and consumed, and reduced to ash which is blown out through outlet conduit 60. With the arrangement of FIG. 7, it will be recognized that it is also possible to provide air inlets at different points to chamber 44 such as at the top of boiler unit 40 or to steam chamber 46. In addition, it will be recognized that thermocouple 110 may be omitted if so desired so that air is constantly supplied to chamber 44 or to steam chamber 46.

While preferred embodiments of the present invention have been described in the foregoing specification and shown in the accompanying drawings, obvious alterations and modifications will be readily apparent to those skilled in the art upon reading and understanding the specification. The present invention covers all such obvious alterations and modifications and is limited only by the scope of the claims.

I claim:

1. A waste disposal system comprising: a fuel burning engine having an exhaust system including exhaust port means and manifold means for discharging hot gases produced by said engine, waste tank means for receiving waste material, vaporizing means for vaporizing said waste material, said vaporizing means being positioned between said engine and said manifold and being heated by gases passing from said exhaust port means to said manifold means, and flow means for feeding waste material from said waste tank to said vaporizing means and for feeding air to said vaporizing means to expose said waste material to heat produced by said engine in the presence of air whereby said waste material is vaporized and burned.

2. The system of claim 1 wherein said flow means is connected for feeding air to said vaporizing means only when said vaporizing means is substantially free of liquid waste material.

3. The system of claim 1 wherein said flow means includes conduit means for feeding waste material from said waste tank to said vaporizing means and air inlet opening means in said vaporizing means for feeding air to said vaporizing means.

4. The system of claim 3 wherein said vaporizing means has vapor outlet conduit means for discharging vapor therefrom, said outlet conduit being connected with said exhaust system for producing a pressure less than atmospheric in said vaporizing means by flow of gasses through said exhaust system from said engine whereby air is drawn through said air inlet opening means.

5. The system of claim 1 wherein said flow means includes conduit means for feeding waste material from said waste tank to said vaporizing means and air pump means for feeding air to said vaporizing means.

6. The system of claim 5 and further including control means responsive to the absence of liquid waste material in said vaporizing means for operating said air pump means.

7. The system of claim 6 wherein said control means includes temperature sensing means for sensing the temperature of said vaporizing means.

* * * * *